United States Patent [19]

Michael et al.

[11] Patent Number: 5,978,080
[45] Date of Patent: Nov. 2, 1999

[54] MACHINE VISION METHODS USING FEEDBACK TO DETERMINE AN ORIENTATION, PIXEL WIDTH AND PIXEL HEIGHT OF A FIELD OF VIEW

[75] Inventors: David J. Michael, Framingham; Aaron S. Wallack, Natick, both of Mass.

[73] Assignee: Cognex Corporation, Natick, Mass.

[21] Appl. No.: 08/938,443

[22] Filed: Sep. 25, 1997

[51] Int. Cl.[6] ........................................................ G01J 1/02
[52] U.S. Cl. .................................................................. 356/243
[58] Field of Search ..................................... 356/243, 375, 356/376, 388, 390; 358/106, 107, 101; 324/158 F; 382/8, 26, 18, 45, 152, 154; 364/474.34, 559, 560, 570, 571.08, 579, 580; 345/156, 158; 348/135, 136, 142, 143

[56] References Cited

U.S. PATENT DOCUMENTS

| | | |
|---|---|---|
| 3,816,722 | 6/1974 | Sakoe et al. . |
| 3,936,800 | 2/1976 | Ejiri et al. . |
| 3,967,100 | 6/1976 | Shimomura . |
| 3,968,475 | 7/1976 | McMahon . |
| 3,978,326 | 8/1976 | Shimomura . |
| 4,011,403 | 3/1977 | Epstein et al. . |
| 4,115,702 | 9/1978 | Nopper . |
| 4,115,762 | 9/1978 | Akiyama et al. . |
| 4,183,013 | 1/1980 | Agrawala et al. . |
| 4,200,861 | 4/1980 | Hubach et al. . |
| 4,254,400 | 3/1981 | Yoda et al. . |
| 4,300,164 | 11/1981 | Sacks . |
| 4,385,322 | 5/1983 | Hubach et al. . |
| 4,441,124 | 4/1984 | Heebner et al. . |
| 4,441,206 | 4/1984 | Kuniyoshi et al. . |
| 4,534,813 | 8/1985 | Williamson et al. . |
| 4,541,116 | 9/1985 | Lougheed . |
| 4,570,180 | 2/1986 | Baier et al. . |

(List continued on next page.)

FOREIGN PATENT DOCUMENTS

| | | |
|---|---|---|
| 0 527 632 A2 | 2/1993 | European Pat. Off. . |
| WO 95/122137 | 8/1995 | WIPO . |
| WO 95/21376 | 8/1995 | WIPO . |
| WO 97/21189 | 6/1997 | WIPO . |
| WO 97/22858 | 6/1997 | WIPO . |
| WO 97/24692 | 7/1997 | WIPO . |
| WO 97/24693 | 7/1997 | WIPO . |

OTHER PUBLICATIONS

Grimson, W. Eric L. and Huttenlocher, Daniel P., "On the Sensitivity of the Hough Transform for Object Recognition", May 1990, IEEE Transactions on Pattern Analysis and Machine Intelligence, vol. 12, No. 3.

(List continued on next page.)

*Primary Examiner*—Frank G. Font
*Assistant Examiner*—Michael P. Stafira
*Attorney, Agent, or Firm*—David J. Powsner; Russ Weinzimmer

[57] ABSTRACT

The invention provides machine vision methods and apparatus for determining a calibration relationship between the imaging reference frame of an image acquisition device (e.g., a camera) and the motion reference frame of a moveable object (e.g., a motion stage) by positioning the object so that a fiducial thereon (e.g., a calibration mark) lies at a first fiducial position in the field of view and recording the corresponding position of the object in the motion reference frame. The object is then repositioned so that the fiducial moves to a second fiducial position in the field of view. Again, the corresponding position of the object in the motion reference frame is recorded. Likewise, the object is moved to a third fiducial position in the field of view, and its corresponding position in the motion reference frame is recorded. A calibration relationship between the motion reference frame of the object and the imaging reference frame of the camera as a function of the first, second and third fiducial positions and as a function of the first, second and third object positions.

27 Claims, 7 Drawing Sheets

U.S. PATENT DOCUMENTS

| | | |
|---|---|---|
| 4,577,344 | 3/1986 | Warren et al. . |
| 4,581,762 | 4/1986 | Lapidus et al. . |
| 4,606,065 | 8/1986 | Beg et al. . |
| 4,617,619 | 10/1986 | Gehly . |
| 4,630,306 | 12/1986 | West et al. . |
| 4,688,088 | 8/1987 | Hamazaki et al. . |
| 4,706,168 | 11/1987 | Weisner . |
| 4,728,195 | 3/1988 | Silver . |
| 4,730,260 | 3/1988 | Mori et al. . |
| 4,731,858 | 3/1988 | Grasmueller et al. . |
| 4,736,437 | 4/1988 | Sacks et al. . |
| 4,742,551 | 5/1988 | Deering . |
| 4,764,870 | 8/1988 | Haskin . |
| 4,771,469 | 9/1988 | Wittenburg . |
| 4,783,826 | 11/1988 | Koso . |
| 4,783,828 | 11/1988 | Sadjadi . |
| 4,783,829 | 11/1988 | Miyakawa et al. . |
| 4,831,580 | 5/1989 | Yamada . |
| 4,860,374 | 8/1989 | Murakami et al. . |
| 4,860,375 | 8/1989 | McCubbrey et al. . |
| 4,876,457 | 10/1989 | Bose . |
| 4,876,728 | 10/1989 | Roth . |
| 4,903,218 | 2/1990 | Longo et al. . |
| 4,907,169 | 3/1990 | Lovoi . |
| 4,914,553 | 4/1990 | Hamada et al. . |
| 4,922,543 | 5/1990 | Ahlbom et al. . |
| 4,926,492 | 5/1990 | Tanaka et al. . |
| 4,932,065 | 6/1990 | Feldgajer . |
| 4,953,224 | 8/1990 | Ichinose et al. . |
| 4,955,062 | 9/1990 | Terui . |
| 4,959,898 | 10/1990 | Landman et al. . |
| 4,962,423 | 10/1990 | Yamada et al. . |
| 4,972,359 | 11/1990 | Silver et al. . |
| 4,982,438 | 1/1991 | Usami et al. . |
| 5,012,402 | 4/1991 | Akiyama . |
| 5,027,419 | 6/1991 | Davis ........................................ 382/28 |
| 5,046,190 | 9/1991 | Daniel et al. . |
| 5,054,096 | 10/1991 | Beizer . |
| 5,060,276 | 10/1991 | Morris et al. . |
| 5,063,608 | 11/1991 | Siegel . |
| 5,073,958 | 12/1991 | Imme . |
| 5,081,656 | 1/1992 | Baker et al. . |
| 5,081,689 | 1/1992 | Meyer et al. . |
| 5,086,478 | 2/1992 | Kelly-Mahaffey et al. . |
| 5,090,576 | 2/1992 | Menten . |
| 5,091,861 | 2/1992 | Geller et al. . |
| 5,091,968 | 2/1992 | Higgins et al. . |
| 5,093,867 | 3/1992 | Hori et al. . |
| 5,113,565 | 5/1992 | Cipolla et al. . |
| 5,115,309 | 5/1992 | Hang . |
| 5,119,435 | 6/1992 | Berkin . |
| 5,124,622 | 6/1992 | Kawamura et al. . |
| 5,133,022 | 7/1992 | Weideman . |
| 5,134,575 | 7/1992 | Takagi . |
| 5,143,436 | 9/1992 | Baylor et al. . |
| 5,145,432 | 9/1992 | Midland et al. . |
| 5,151,951 | 9/1992 | Ueda et al. . |
| 5,153,925 | 10/1992 | Tanioka et al. . |
| 5,159,281 | 10/1992 | Hedstrom et al. . |
| 5,159,645 | 10/1992 | Kumagai . |
| 5,164,994 | 11/1992 | Bushroe . |
| 5,168,269 | 12/1992 | Harlan . |
| 5,179,419 | 1/1993 | Palmquist et al. ..................... 356/73.1 |
| 5,185,855 | 2/1993 | Kato et al. . |
| 5,189,712 | 2/1993 | Kajiwara et al. . |
| 5,206,820 | 4/1993 | Ammann et al. . |
| 5,216,503 | 6/1993 | Paik . |
| 5,225,940 | 7/1993 | Ishii et al. . |
| 5,230,027 | 7/1993 | Kikuchi . |
| 5,243,607 | 9/1993 | Masson et al. . |
| 5,253,306 | 10/1993 | Nishio . |
| 5,253,308 | 10/1993 | Johnson . |
| 5,265,173 | 11/1993 | Griffin et al. . |
| 5,271,068 | 12/1993 | Ueda et al. . |
| 5,287,449 | 2/1994 | Kojima . |
| 5,297,238 | 3/1994 | Wang et al. .............................. 395/94 |
| 5,297,256 | 3/1994 | Wolstenholme et al. . |
| 5,299,269 | 3/1994 | Gaborski et al. . |
| 5,311,598 | 5/1994 | Bose et al. . |
| 5,315,388 | 5/1994 | Shen et al. . |
| 5,319,457 | 6/1994 | Nakahashi et al. . |
| 5,327,156 | 7/1994 | Masukane et al. . |
| 5,329,469 | 7/1994 | Watanabe .......................... 364/571.01 |
| 5,337,267 | 8/1994 | Colavin . |
| 5,363,507 | 11/1994 | Nakayama et al. . |
| 5,367,439 | 11/1994 | Mayer et al. . |
| 5,367,667 | 11/1994 | Wahlquist et al. . |
| 5,371,690 | 12/1994 | Engel et al. . |
| 5,388,197 | 2/1995 | Rayner . |
| 5,388,252 | 2/1995 | Dreste et al. . |
| 5,398,292 | 3/1995 | Aoyama . |
| 5,432,525 | 7/1995 | Maruo et al. . |
| 5,440,699 | 8/1995 | Farrand et al. . |
| 5,455,870 | 10/1995 | Sepai et al. . |
| 5,455,933 | 10/1995 | Schieve et al. . |
| 5,471,312 | 11/1995 | Watanabe et al. ...................... 358/296 |
| 5,475,766 | 12/1995 | Tsuchiya et al. . |
| 5,477,138 | 12/1995 | Efjavic et al. . |
| 5,481,712 | 1/1996 | Silver et al. . |
| 5,485,570 | 1/1996 | Bushboom et al. . |
| 5,491,780 | 2/1996 | Fyles et al. . |
| 5,495,424 | 2/1996 | Tokura . |
| 5,495,537 | 2/1996 | Bedrosian et al. . |
| 5,519,840 | 5/1996 | Matias et al. . |
| 5,526,050 | 6/1996 | King et al. . |
| 5,532,739 | 7/1996 | Garakani et al. . |
| 5,550,763 | 8/1996 | Michael . |
| 5,553,859 | 9/1996 | Kelly et al. ............................. 273/338 |
| 5,557,410 | 9/1996 | Huber et al. ............................ 356/376 |
| 5,566,877 | 10/1996 | McCormack . |
| 5,568,563 | 10/1996 | Tanaka et al. . |
| 5,574,668 | 11/1996 | Beaty . |
| 5,574,801 | 11/1996 | Collet-Beillon . |
| 5,583,949 | 12/1996 | Smith et al. . |
| 5,583,954 | 12/1996 | Garakani . |
| 5,592,562 | 1/1997 | Rooks . |
| 5,594,859 | 1/1997 | Palmer et al. . |
| 5,602,937 | 2/1997 | Bedrosian et al. . |
| 5,608,872 | 3/1997 | Schwartz et al. . |
| 5,640,199 | 6/1997 | Garakani et al. . |
| 5,640,200 | 6/1997 | Michael . |
| 5,764,217 | 6/1998 | Borrel et al. ............................ 345/156 |
| 5,796,386 | 8/1998 | Lipscomb et al. ...................... 345/156 |

OTHER PUBLICATIONS

Medina–Mora et al. (1981) An Incremental Programming Environment, IEEE Transactions on Software Eng. SE–7:472–482.

Teitelbaum et al., (19810 The Cornell Program Synthesizer: A Syntax–Directed Programming Environment, Communications of the ACM 24:563–573.

Newsletter from Acquity Imaging, Inc., "Remote Vision Support Package—The Phones Are Ringing!," 1 page.

PictureTel Corporation Product Brochure "PICTURETEL LIVE PCS 100(tm) Personal Visual Communications System," 3 page (1993).

PictureTel Corporation Product Brochure "PICTURETEL SYSTEM 1000: Complete Videoconferencing for Cost Sensitive Applications," 4 page (1993).

PictureTel Corporation Product Brochure, "PICTURETEL SYSTEM 4000(tm) A Family of Models to Fit Your Application From Offices to Boardrooms, Classrooms, and Auditoriums," 4 page (1993).

Symantec Corporation, "The Norton pcANYWHERE USER'S GUIDE," Table of Contents 8 pp; Introduction of pcANYWHERE Technology pp. i–vii; Chapter 7—Sessions; pp. 191–240 (1991).

Bursky, Dave, "CMOS Four–Chip Set Process Images at 20–MHz Data Rates," Electronic Design, May 28, 1987, pp. 39–44.

Plessey Semiconductors, Preliminary Informstion, May 1986, Publication No. PS2067, May 1986, pp. 1–5.

NEC Electronics Inc., PD7281 Image Pipelined Processor, Product Information Brochure, pp. 2–169—2–211.

Horn, Berthold Klaus Paul. "Robot Vision", The Massachusetts Institute for Technology, 1986.

Rosenfeld, Azriel. "Computer Vision: Basic Principles," Proceedings of the IEEE. vol. 76, No. 8, Aug. 1988. pp. 863–868.

MACHINE VISION METHODS USING FEEDBACK TO DETERMINE AN ORIENTATION, PIXEL WIDTH AND PIXEL HEIGHT OF A FIELD OF VIEW

RESERVATION OF COPYRIGHT

The disclosure of this patent document contains material that is subject to copyright protection. The owner thereof has no objection to facsimile reproduction by anyone of the patent document or the patent disclosure, as it appears in the U.S. Patent and Trademark Office patent file or records, but otherwise reserves all copyright rights whatsoever.

BACKGROUND OF THE INVENTION

The invention pertains to machine vision and, more particularly, to methods for calibrating the imaging reference frame of a camera (or other image acquisition device) to that of a moveable object imaged by the camera.

Machine vision is the automated analysis of images to determine characteristics of objects shown in them. It is often employed in automated manufacturing lines, where images of components are analyzed to determine placement and alignment during assembly. Machine vision is also used for quality assurance. For example, in the semiconductor device industry, images of chips are analyzed to insure that leads, solder paste and other components do not overrun designated boundaries.

In many machine vision applications, it is essential to correlate physical coordinates in the "real world" with pixel coordinates in an image. For example, a camera image of a circuit board being assembled on a motion stage—a motorized platform that can be positioned by rotation and by movement along the x- and y-axes—may reveal that a chip or other component is misplaced by several pixels. In order to properly reposition the stage, the precise relationship between coordinates in the image and those of the stage must be known.

That relationship is known as the calibration relationship. It includes the angular orientation of the reference frame of the image vis-à-vis the reference frame of motion of the stage; the ratio of a unit of height (i.e., pixel height) in the image reference frame to a unit of motion along the y-axis of the stage; the ratio of a unit of width (i.e., pixel width) in the image reference frame to a unit of motion along the x-axis of the stage; and the location of a point in the image reference frame (e.g., the center of the camera field of view) vis-à-vis a point in the motion reference frame (e.g., the center of rotation of the stage).

The prior art suggests the use of calibration plates to determine the relationship between the imaging and motion reference frames. The surfaces of these plates are typically machined or etched with precisely spaced markings such as checkerboards, "bulls-eyes," or other such patterns. When camera images of the plate and stage are analyzed, the known spacings between markings on the plate are compared with those that appear in the images, thus, enabling calculation of the calibration relationship.

It is important to fabricate calibration plates carefully, because any imperfections in the marking pattern lead to inaccurate calibrations. Unfortunately, even a precisely machined calibration plate may not be sufficiently accurate for use in calibrating highly magnified images. Small deviations falling well within tight machine tolerances may adversely affect the calibration relationship.

In view of the foregoing, an object of this invention is to provide improved machine vision systems and, particularly, improved machine visions systems for calibrating the imaging reference frame of a camera or other image acquisition device to the motion reference frame of a motion stage, conveyor belt or other moveable object imaged by the camera.

A more particular object of the invention is to provide machine vision methods and apparatus that facilitate determination of the angle of orientation, pixel height and pixel width of a camera field of view relative to the frame of reference of motion of an object.

A still more particular object of the invention is to provide such methods and apparatus as are capable of providing accurate calibrations without the use of expensive calibration plates.

Yet another object of the invention is to provide such methods and apparatus as can be implemented on conventional digital data processors or other conventional machine vision analysis equipment.

Yet still another object of the invention is to provide such methods and apparatus that can rapidly determine calibration relationships quickly and without undue consumption of resources.

SUMMARY OF THE INVENTION

The foregoing are among those objects attained by the invention, which provides improved machine vision methods and apparatus for determining a calibration relationship between the imaging reference frame of an image acquisition device, e.g., camera, and the motion reference frame of a moveable object, e.g., a motion stage. The invention particularly provides methods and apparatus for determining the angular orientation ($\tau$) of the imaging reference frame vis-à-vis the motion reference frame, the unit or pixel height (h) of the imaging reference frame vis-à-vis the motion reference frame, and the unit or pixel width (w) of the imaging reference frame vis-à-vis the motion reference frame.

In one aspect, the invention provides a method for determining such a calibration relationship by positioning the object (e.g., the motion stage) so that a fiducial thereon (e.g., a calibration mark) lies at a specified position (the "first fiducial position") in the imaging reference frame and, more particularly, in the field of view. The corresponding position of the object in the motion reference frame is recorded. In the case of a motion stage, for example, that position (the "first object position") may be obtained from indicators or read-outs on the stage's x-axis and y-axis motors.

The method contemplates repositioning the object so that the fiducial moves to a second specified position (the "second fiducial position") in the imaging reference frame and, more particularly, in the field of view. Again, the corresponding position (the "second object position") of the object in the motion reference frame is recorded.

Likewise, the object is moved to a third specified position (the "third fiducial position") in the field of view, and its corresponding position (the "third object position") in the motion reference frame is recorded.

The method further contemplates determining a calibration relationship between the motion reference frame of the object and the imaging reference frame of the camera as a function of the first, second and third fiducial positions and as a function of the first, second and third object positions.

In related aspects of the invention, second and third fiducial positions are equidistant from the first fiducial position, which can lie at the center of the field of view. In further related aspects, the second and third fiducial positions lie along line segments that emanate from the first fiducial position and that are perpendicular to one another.

Thus, for example, if the center of the field of view is deemed an "origin" of the imaging reference frame and the first fiducial position lies at that origin, the second and third fiducial positions can lie at points a specified distance from that origin along respective axes of the imaging reference frame. That specified distance is preferably one that facilitates evaluation of the mathematical expressions below, i.e., an integer distance, and, still more preferably, a distance such as 1 pixel, 10 pixels, 100 pixels, and so forth.

Further aspects of the invention provide methods as described above, in which the orientation of the imaging reference frame vis-à-vis the motion reference frame is determined in accord with the mathematical relation:

$$\tau = \text{atan2}\ (m_{y1} - m_{y0}, m_{x1} - m_{x0})$$

where $\tau$ is the orientation of the imaging reference frame vis-à-vis the motion reference frame; $(m_{x0}, m_{y0})$ are the motion reference frame coordinates of the first object position; $(m_{x1}, m_{y1})$ are the motion reference frame coordinates of the second object position; and tan2 ( ) is an arctangent function.

Still further aspects of the invention provide methods as described above in which the unit or pixel height and width of the imaging reference frame vis-à-vis the motion reference frame is determined in accord with the mathematical relations:

$$w = \text{sqrt}\ ((m_{y1} - m_{y0})^2 + (m_{x1} - m_{x0})^2) / \text{abs}\ (i_{x1} - i_{x0})$$

$$h = \text{sqrt}\ ((m_{y2} - m_{y0})^2 + (m_{x2} - m_{x0})^2) / \text{abs}\ (i_{y2} - i_{y0})$$

where, w is the unit height of the imaging reference frame vis-à-vis the motion reference frame; h is the unit height of the imaging reference frame vis-à-vis the motion reference frame; $(m_{x0}, m_{y0})$ are the motion reference frame coordinates of the first object position; $(m_{x1}, m_{y1})$ are the motion reference frame coordinates of the second object position; $(m_{x2}, m_{y2})$ are the motion reference frame coordinates of the third object position; $(i_{x0}, i_{y0})$ are the image coordinates of the first object position; $(i_{x1}, i_{y1})$ are the image coordinates of the second object position; $(i_{x2}, i_{y2})$ are the image coordinates of the second object position; and sqrt ( ) is a square root function.

In still other aspects, the invention provides apparatus operating in accord with the methodology above for determining the aforementioned calibration relationship.

In yet still other aspects, the invention provides articles of manufacture embodying a computer program for causing a digital data processing apparatus to determine calibration relationships in accord with the methods above.

These and other aspects of the invention are evident in the drawings and in the description that follows.

The invention has wide application in industry and research applications. It facilitates the calibration of machine vision image acquisition equipment (e.g., cameras) in order to improve the speed and accuracy of analysis of objects under inspection. Thus, for example, a machine vision system calibrated in accord with the invention can be used to automatically control movement of an assembly line motion stage without reliance on expensive, and possibly flawed, calibration plates.

BRIEF DESCRIPTION OF THE DRAWINGS

A more complete understanding of the invention may be attained by reference to the drawings, in which.

DETAILED DESCRIPTION OF THE ILLUSTRATED EMBODIMENT

Figure 1:
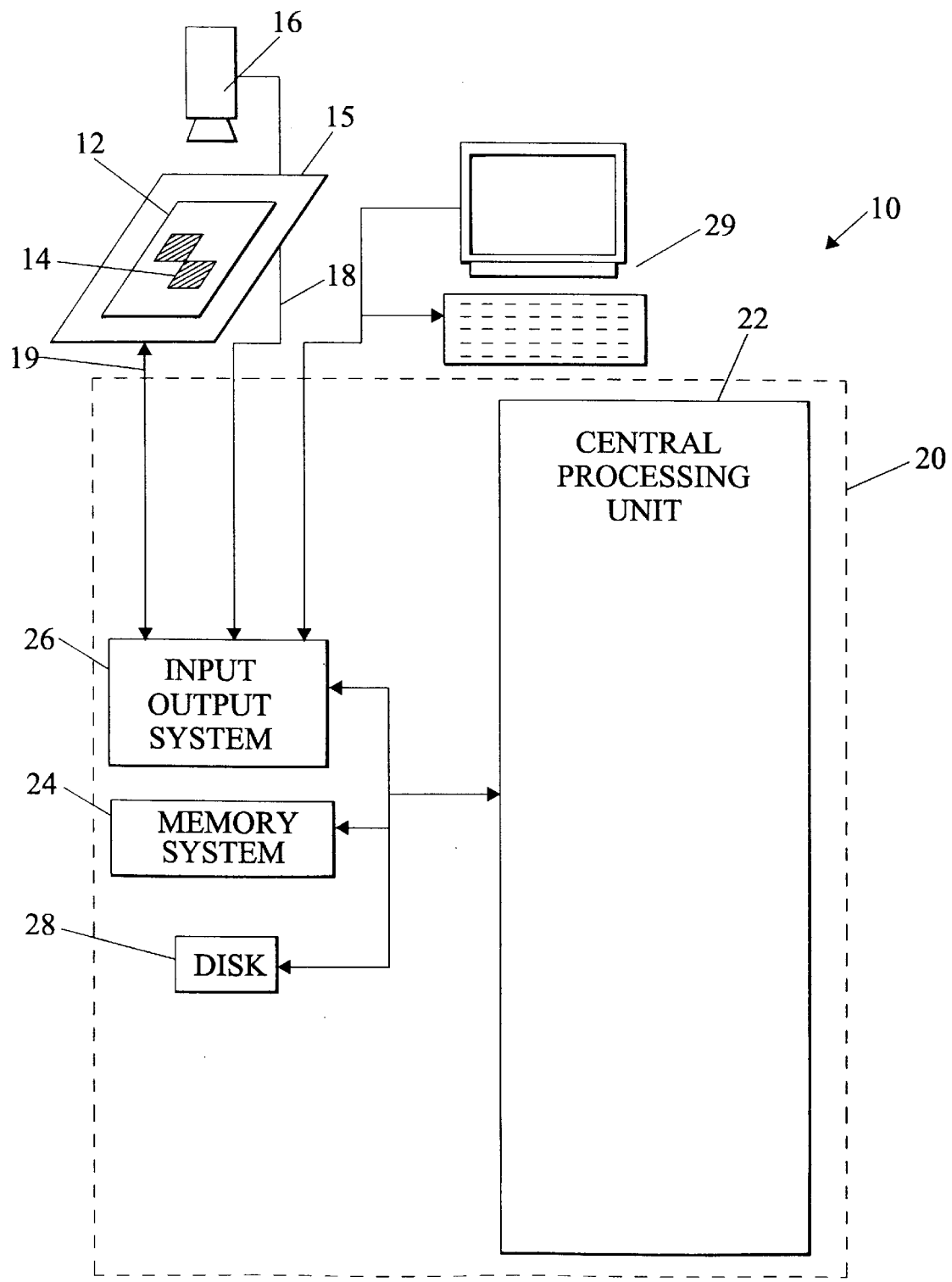
FIG. 1 depicts a machine vision system for practice of the invention.

FIG. 1 depicts a machine vision system 10 according to the invention for determining calibration relationship between the motion reference frame of an object 12 (e.g., a printed circuit board under assembly) and the imaging reference frames of image acquisition device 16 (e.g., a video camera). The system 10 includes an image capture device, e.g., video camera 16, that generates an image of a scene including object 12. Digital image data (or pixels) generated by the capturing device 16 represent, in the conventional manner, the image intensity (e.g., contrast, color, brightness) of each point in the field of view of the capturing device.

In the illustration, the object 12 is disposed on a conventional motion stage 15 of the type commercially available in the industry and capable of translating and rotating the object 12. In the illustrated embodiment, motion stage 15 has an actuator with a rotator mounted on a translating base such that the stage's center of rotation translates with the base. The term center of rotation refers to the (x,y) location of the physical point which remains stationary when the motion stage rotates. A preferred motion stage 15 has three degrees of freedom. Those skilled in the art will appreciate that the object 12 need not be disposed on a motion stage but, rather, can be disposed on a conveyor belt or other such conveyance device or it can be self-propelled.

Digital image data is transmitted from capturing device 16 via a communications path 18 to an image analysis system 20. This can be a conventional digital data processor, or a vision processing system of the type commercially available from the assignee hereof, Cognex Corporation, as programmed in accord with the teachings hereof to determine the calibration relationship between the motion reference frame of the object 12 and the imaging reference frame of image acquisition device 16. The image analysis system 20 may have one or more central processing units 22, main memory 24, input-output system 26, and disk drive (or other mass storage device) 28, monitor and keyboard (or other user interface devices) 29, all of the conventional type.

The image acquisition device may be video camera, charge coupled display (CCD) device, or any other device suitable for imaging at least a fiducial 14 disposed on object 12.

The image analysis system 20 can control movement of the object via communications path 19. More particularly, the system 20 transmits signals for controlling translation and rotation of the motion stage 15 and, in turn, controls the position of object 12 on stage 15.

The system 20 and, more particularly, central processing unit 22, is configured by programming instructions according to teachings hereof for operation as further described and illustrated herein. Those skilled in the art will appreciate that, in addition to implementation on a programmable digital data processor, the methods taught herein can be implemented in special purpose hardware.

Figure 2:
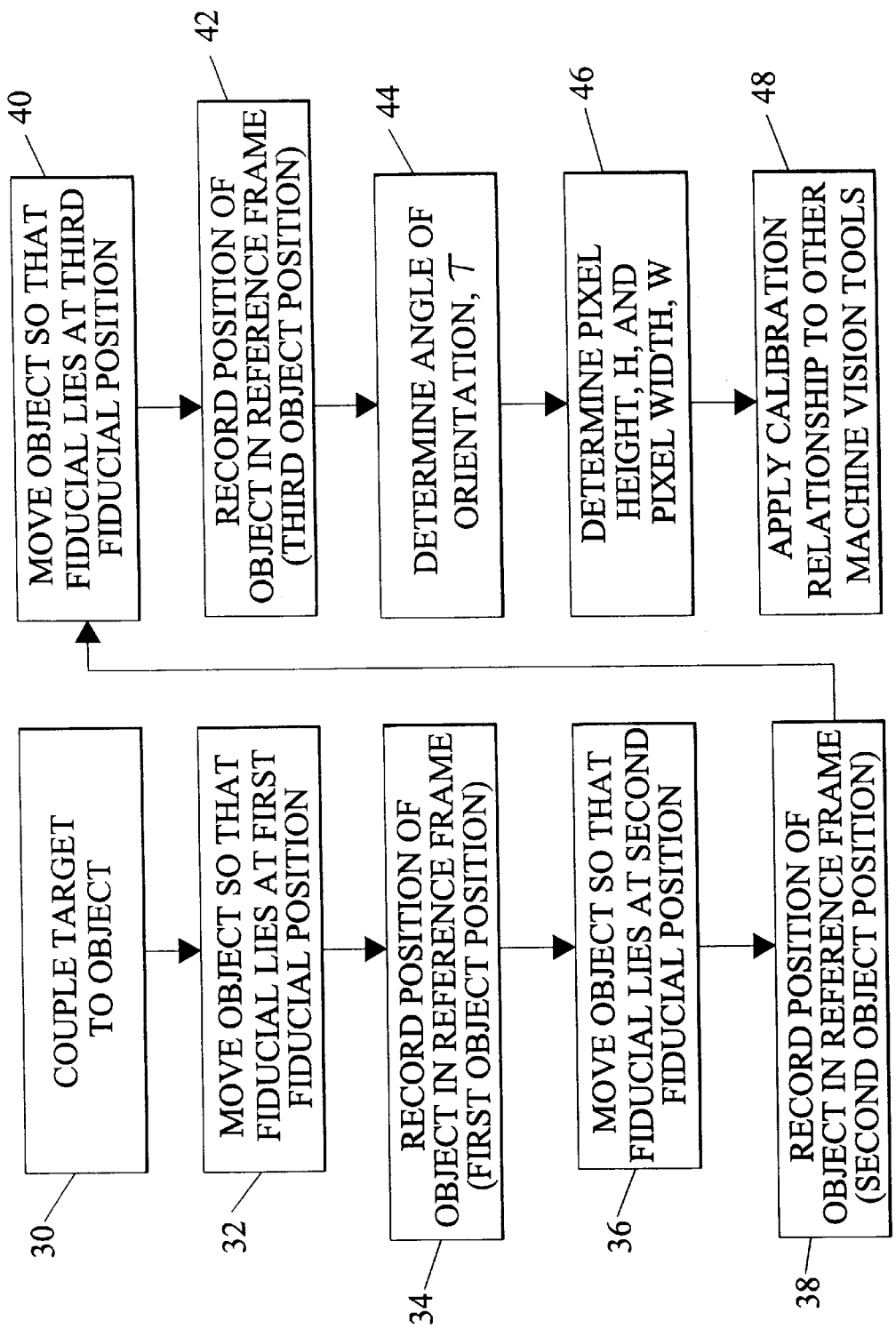
FIG. 2 depicts a method according to the invention for determining a calibration relationship between the reference frame of motion of an object and the imaging reference frame of an image acquisition device.

FIG. 2 depicts a method for determining a calibration relationship between the reference frame of motion of an object 12—and, more particularly, in the case of an object 12 that is disposed on a motion stage 15, the reference frame of motion of the motion stage 15—and the imaging reference frame of image acquisition device 16. More specifically, the drawing depicts a method according to the invention for determining the angular orientation ($\tau$) of the imaging reference frame vis-à-vis the motion reference frame, the unit or pixel height (h) of the imaging reference frame vis-à-vis the motion reference frame, and the unit or pixel width (w) of the imaging reference frame vis-à-vis the motion reference frame.

The method includes a step 30 of coupling a fiducial 14 to the object. Insofar as the position of the fiducial 14 relative to the object 12 is not critical to the invention, the fiducial 14 can be placed on the object 12 at any location—so long as the fiducial so placed can be moved within the field of view of image acquisition 16, e.g., by motion stage 15.

Figure 3A:
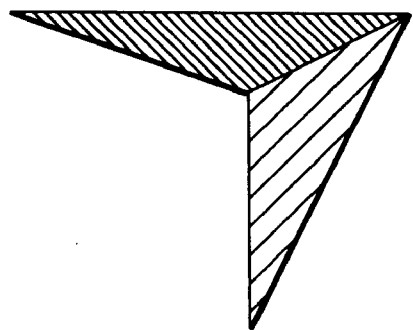
FIGS. 3A–3C depict magnitude invariant fiducials of the type used in a preferred practice of the invention.
Figure 3B:
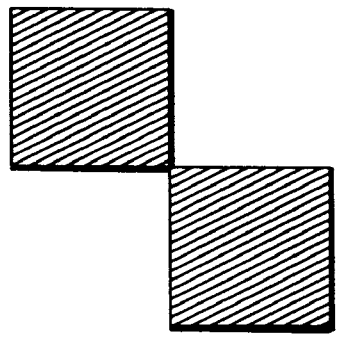
Figure 3C:
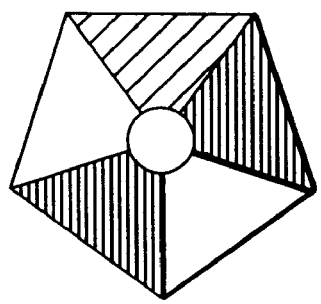

The fiducial 14 can be any conventional calibration target (e.g., an array of dots, a checkerboard, a bulls-eye of concentric circles, or a set of parallel stripes) though, more preferably, it is a magnification invariant target of the type shown in FIGS. 3A–3C and disclosed in co-pending, commonly assigned U.S. patent application Ser. No. 08/726,521, filed Oct. 7, 1996 (Attorney Docket: 0150448-0036). As discussed in further detail in that co-pending, commonly assigned application (the teachings of which are incorporated herein by reference), a preferred calibration target has two or more regions, each having a different "imagable characteristic" (e.g., a different color, contrast, or brightness) from its neighboring region(s). Each region has at least two edges—referred to as "adjoining edges"—that are linear and that are directed toward and, optionally meet at, a reference point (e.g., the center of the target or some other location of interest).

Determination of the location in an image of the fiducial 14 may be accomplished in any conventional manner known in the art. For fiducials of the type shown in FIGS. 3A–3C and described in the aforementioned U.S. patent application Ser. No. 08/726,521, location determinations are preferably accomplished via the techniques disclosed, e.g., in FIG. 4 of that application and in the accompanying text thereof The fiducial 14 can be molded onto, etched into, printed on, or otherwise coupled to the object. In instances where the object 12 resides on a motion stage 15, the fiducial 14 is typically placed on a calibration frame, e.g., a rigid frame (not shown), which, in turn, is placed on the motion stage. Although the calibration plate can be bolted, fit or otherwise coupled to the motion stage, preferably, it is placed on the stage 15 and held in place by a vacuum (though, it can simply be held on by friction).

With reference to FIG. 2, in step 32 the method calls for moving the object 12, e.g., via motion stage 15, so that the fiducial 14 lies in the field of view (FOV) of the image acquisition device 16 at a location referred to herein as the first fiducial position. Though the first fiducial position can lie anywhere in the field of view of device 16, in a preferred embodiment, it lies at the center of the field of view.

Figure 7:
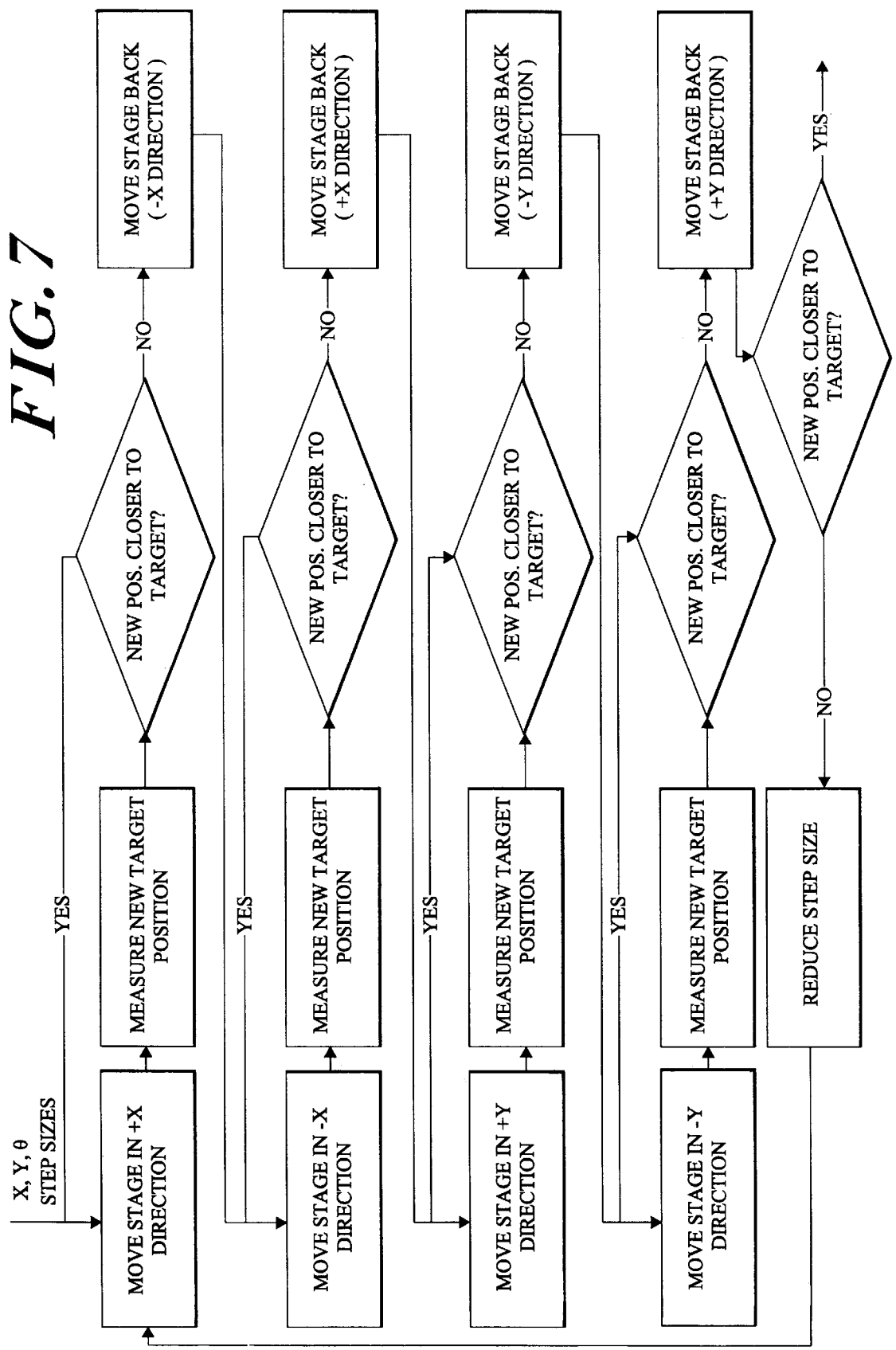
FIG. 7 depicts a technique according to the invention for positioning an object so that the fiducial falls at a specific location within the field of view of the camera.

Movement of the object to attain positioning of the fiducial 14 can be accomplished in any manner known in the art though, preferably, it is accomplished using the technique illustrated in FIG. 7 to move the object 12 so that fiducial falls at a specific location within the FOV.

The first fiducial position comprises coordinates in the imaging reference frame, that is, in the coordinate system of images generated by image acquisition device 16. Axes of that reference frame are shown as 50x, 50y in the drawings. Although those coordinates can be in any units, preferably, they are in pixels. In embodiments where step 32 involves moving the object 12 until the fiducial 14 falls anywhere in the FOV, but not to a specific location therein, the pixel coordinates of the first fiducial position are determined in accord conventional techniques for locating a fiducial in an image. In a preferred embodiment, where step 32 utilizes the technique illustrated in FIG. 7 to move the object 12 so that fiducial falls at a specific location within the FOV, e.g., the center of the FOV, the coordinates of that specific location are deemed to be the first fiducial position.

In step 34, the method calls for determining, in the motion reference frame, the position of the object 12 that results from the movement effected in step 32. That position, which is referred to herein as the "first object position," can be determined by use of rulers, calipers, interferometry, telemetry, or other such techniques capable of identifying the position of the object 12 relative to a reference. In a preferred embodiment, in which the object 12 is disposed on a motion stage 15, the first object position is determined from the positional settings on the stage itself, e.g., from the indicators or read-outs on the stage's x-axis and y-axis motors (not shown).

The motion reference frame is the coordinate system in which the object 12 moves. For example, in embodiments where the object 12 is disposed on a motion stage 15, that coordinate system and reference frame is defined by the x-axis and y-axis motion of the stage. In the drawings, the motion reference frame is represented by axis 52x, 52y.

Unlike the first fiducial position (the coordinates of which are typically expressed in pixels), the coordinates of the first object position are expressed in inches, centimeters, or other such units of measurement—though, the invention is not so limited. In a preferred embodiment in which object 12 is disposed on a motion stage 15, the first object position is expressed in units defined by the stage's x-axis and y-axis motor indicators or read-outs.

In step 36, the method repositions the object 12 so that the fiducial moves to a "second fiducial position," in the field of view. Though that position can lie anywhere in the field of view relative to the first specified position, preferably, it lies a specified distance from the first fiducial position in the x-axis direction of the imaging reference frame. In step 38, the method calls for determining and recording the motion reference frame coordinates of the object 12 at the position resulting from the movement effected in step 36.

In step 40, the method repositions the object 12 so that the fiducial moves to a "third fiducial position," in the field of view. Again, that position can lie anywhere in the field of view relative to the first and second specified positions, though, preferably, it lies a specified distance from the first fiducial position in the y-axis direction of the imaging reference frame. In step 42, the method calls for determining and recording the motion reference frame coordinates of the object 12 at the position resulting from the from the movement effected in step 40.

In a preferred embodiment, the second and third fiducial positions lie equidistant from the first fiducial position in directions parallel to the x-axis and y-axis, respectively, of the imaging reference frame 50x, 50y. That distance, referred to as the "specified distance," above, is preferably selected to facilitate evaluation of the mathematical expressions below, i.e., an integer distance, and, still more preferably, a distance such as 1 pixel, 10 pixels, 100 pixels, and so forth.

Figure 4A:
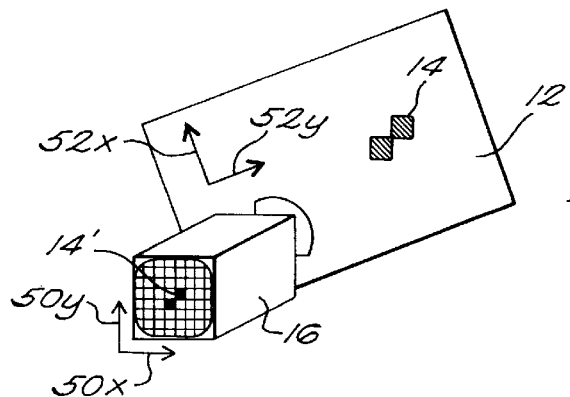
FIGS. 4A–4D depict the positioning and repositioning of an object and its fiducial during practice of the invention.
Figure 4B:
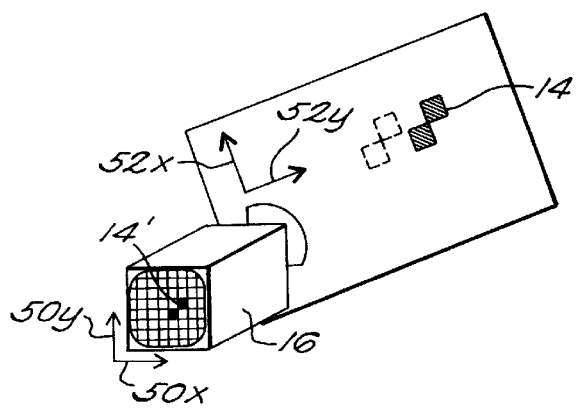
Figure 4C:
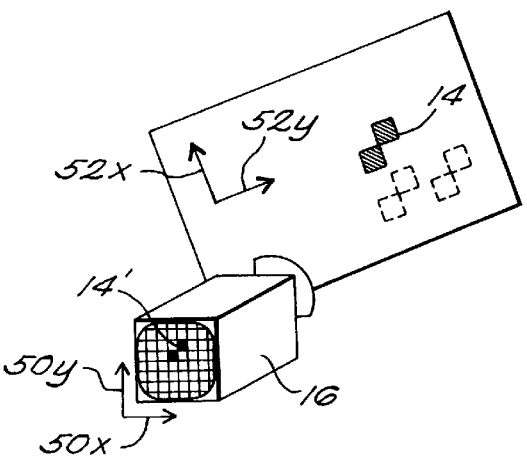
Figure 4D:
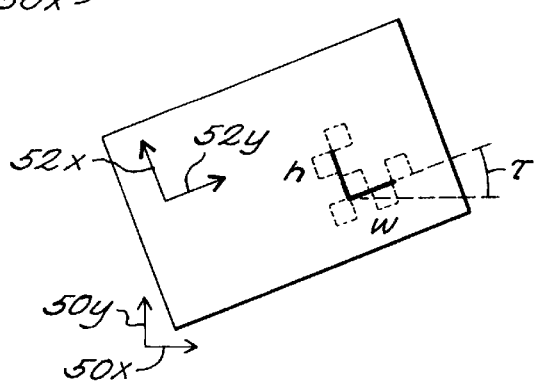

Positioning of the object 12 in accord with steps 32, 36, and 40 is shown in FIGS. 4A, 4B and 4C, respectively.

Referring to FIG. 4A, object 12 is shown as having been positioned (e.g., via movement of a motion stage) per step 32 such that the image 14' of fiducial 14 lies in the center of the field of view of image acquisition device 16. For simplicity of illustration, that field of view is graphically depicted as an image on the back surface of device 16. In preferred embodiments, such an image is optionally presented on a separate monitor 29 attached to the system 10. Still more preferably, the image is electronically transmitted to the image analysis system 20 for determination of fiducial position.

Referring to FIG. 4B, object 12 is shown as having been positioned (e.g., via movement of a motion stage) per step 36 such that the image 14' of fiducial 14 lies at the second fiducial position, e.g., 1 pixel along the positive x-axis 50x from the center of the field of view of image acquisition device 16. The drawing also shows the relative positions of the first and second object positions. Specifically, fiducial 14 is shown at the second object position corresponding to the second fiducial position. A "ghost" image of the fiducial 14 (grayed in the illustration) is shown at the position corresponding to the first object position.

Referring to FIG. 4C, object 12 is shown as having been positioned (e.g., via movement of a motion stage) per step 40 such that the image 14' of fiducial 14 lies at the third fiducial position, e.g., 1 pixel along the positive y-axis 50y from the center of the field of view of image acquisition device 16. The drawing also shows the relative positions of the first, second and third object positions. Specifically, fiducial 14 is shown at the third object position corresponding to the third fiducial position. "Ghost" images of the fiducial 14 (grayed in the illustration) are shown at the position corresponding to the first and second object positions.

In step 44, the method calls for determining the orientation, τ, of the imaging reference frame 50x, 50y vis-à-vis the motion reference frame 52x, 52y. Graphically, this is illustrated as the angle between the horizontal of the imaging reference frame 50x and the horizontal 52x of the motion reference frame.

In a preferred embodiment, τ, is computed in accord with the mathematical relation:

$$\tau = \text{atan2}\ (m_{y1} - m_{y0},\ m_{x1} - m_{x0})$$

where τ is the orientation of the imaging reference frame vis-à-vis the motion reference frame; $(m_{x0}, m_{y0})$ are the motion reference frame coordinates of the first object position; $(m_{x1}, m_{y1})$ are the motion reference frame coordinates of the second object position; and tan2 ( ) is an arctangent function.

In step 46, the method calls for determining the unit or pixel height, h, and width, w, of the imaging reference frame

50x, 50y vis-à-vis the motion reference frame 52x, 52y. In a preferred embodiment, these are computed in accord with the mathematical relations:

$$w = \text{sqrt}\ ((m_{y1} - m_{y0})^2 + (m_{x1} - m_{x0})^2)/\text{abs}\ (i_{x1} - i_{x0})$$

$$h = \text{sqrt}\ ((m_{y2} - m_{y0})^2 + (m_{x2} - m_{x0})^2)/\text{abs}\ (i_{y2} - i_{y0})$$

where, w is the unit height of the imaging reference frame vis-à-vis the motion reference frame; h is the unit height of the imaging reference frame vis-à-vis the motion reference frame; $(m_{x0}, m_{y0})$ are the motion reference frame coordinates of the first object position; $(m_{x1}, m_{y1})$ are the motion reference frame coordinates of the second object position; $(m_{x2}, m_{y2})$ are the motion reference frame coordinates of the third object position; $(i_{x0}, i_{y0})$ are the image coordinates of the first object position; $(i_{x1}, i_{y1})$ are the image coordinates of the second object position; $(i_{x2}, i_{y2})$ are the image coordinates of the second object position; and sqrt ( ) is a square root function.

In step 48, the calibration relationships—specifically, τ, w and h—are used to initialize other machine vision tools and, thereby, to facilitate their operation on images of the object 12.

Figure 5:
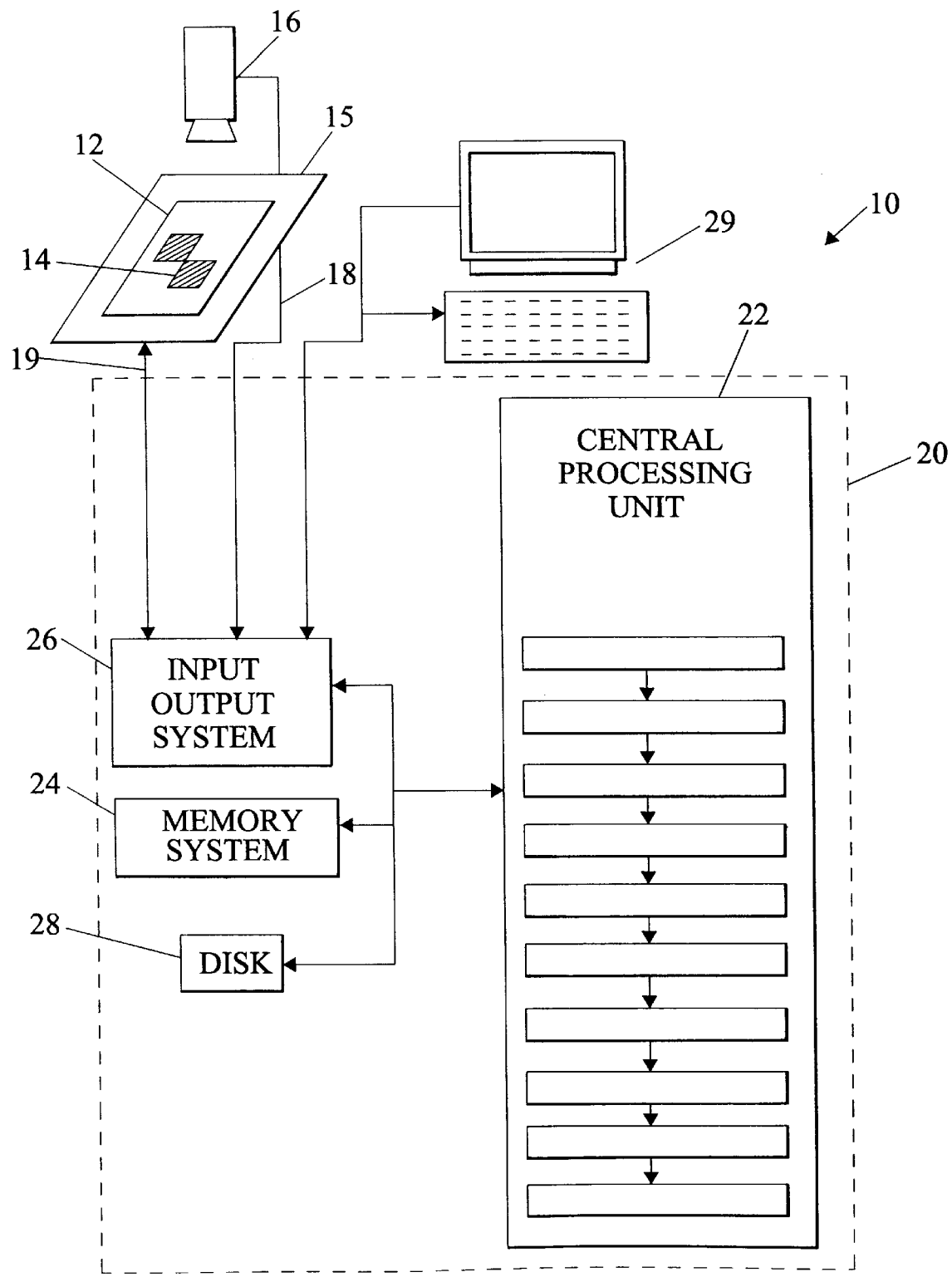
FIG. 5 depicts an apparatus configured for carrying out the method of FIG. 2.

FIG. 5 illustrates apparatus 10 configured for determining calibration relationships using the methodology discussed above. The device 10 is constructed and operated identically to that described above, e.g., in FIGS. 1 and 2. As particularly indicated by the flow-chart outline within the illustrated central processing unit 22, that element is configured using conventional computer programming techniques to execute steps 32–48, discussed above, and thereby to serve as means for providing that functionality.

By way of example, programming instructions corresponding to steps 32–34 configure the system 10 as a first positioning element for carrying out the functionality of those steps; programming instructions corresponding to steps 36–38 configure the system 10 as a second positioning element for carrying out the functionality of those steps; programming instructions corresponding to steps 40–42 configure the system 10 as a third positioning element for carrying out the functionality of those steps; and programming instructions corresponding to steps 44–48 configure the system 10 as an analysis element for carrying out the functionality of those steps and for optionally passing the calibration information to other vision processing software tools or apparatus (not shown). It will, of course, be appreciated by way of example that the first, second and third positioning elements comprise not only the programmed central processing unit, but also the other components of the system, e.g., motion stage 15 and image acquisition device 16, necessary to acquire images of the object 12 and to effect motion thereof for purposes of repositioning the fiducial 14.

Figure 6:
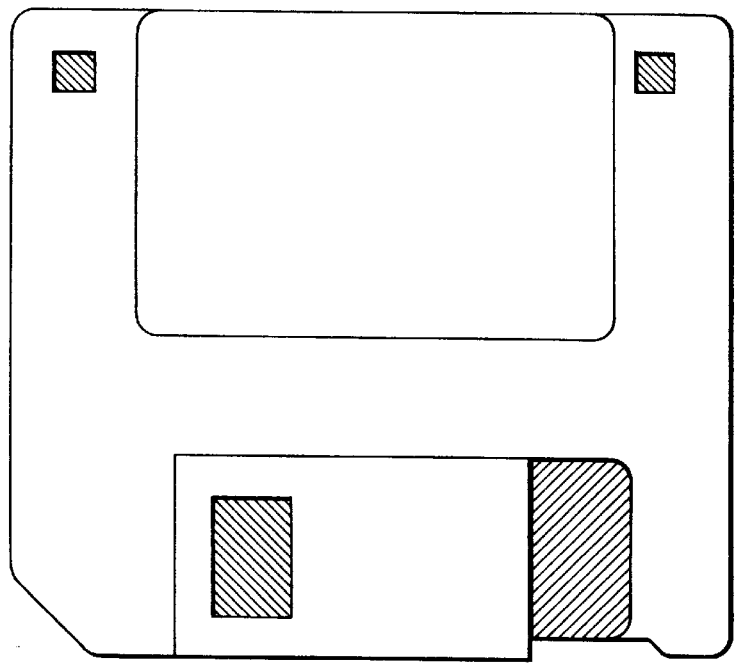
FIG. 6 depicts a computer readable medium containing programming instructions for configuring a general purpose computer in practice the invention.
Figure 6:
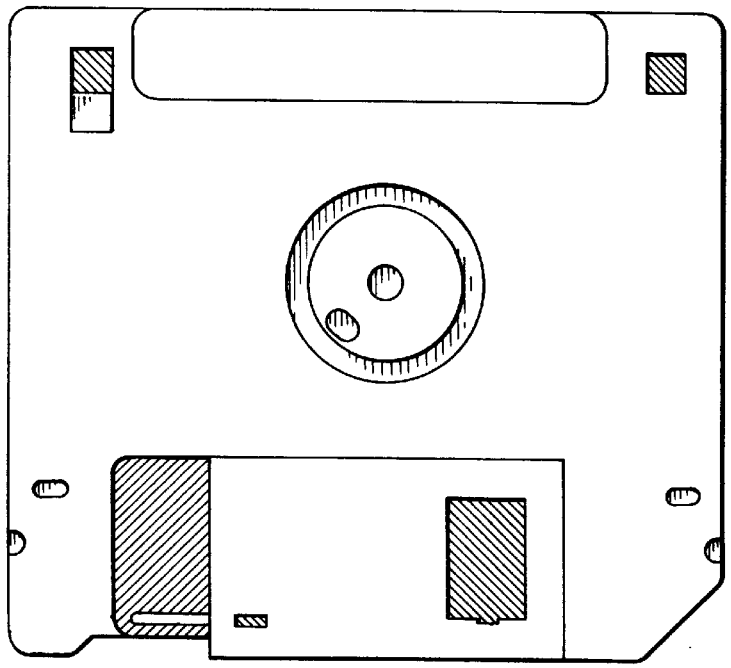

FIG. 6 depicts an article of manufacture, to wit, a magnetic diskette, composed of a computer usable media, to wit, a magnetic disk, embodying a computer program that causes device 30, or other such digital data processing apparatus, to operate in accord with the methods described above in connection with FIGS. 1–5. The diskette is shown in front view and back view. It is of conventional construction and has the computer program stored on the magnetic media therein in a conventional manner readable, e.g., via a read/write head contained in a diskette drive of apparatus 30. It will be appreciated that diskette is shown by way of example only and that other articles of manufacture comprising computer usable media on which programs intended to cause a computer to execute in accord with the teachings hereof are also embraced by the invention.

Described above are apparatus and methods meeting the objects set forth herein. Those skilled in the art will appreciate that the specific embodiments illustrated in the drawings and described above are illustrative only, and that other embodiments incorporating modifications thereto fall within the scope of the invention. Thus, for example, it will be appreciated that the object can be moved so that the fiducial attains the first, second and third fiducial positions in any order—not necessarily, in the specific order described above. Moreover, for example, it will be appreciated that the distance between the first and second fiducials not be identical to the distance between the first and third fiducials, so long as the actual distances are taken into account in the mathematical expression that is used to determine the calibration relationship. Still further, for example, it will be appreciated that the methods and apparatus described above need not be implemented in software but, rather, can be implemented in hardware as well.

In view of the foregoing, what we claim is:

1. A machine vision method of determining a calibration relationship between a motion reference frame of a moveable object and an imaging reference frame of an imaging device that acquires an image of the object, the method comprising the steps of:

A. positioning the object so that a fiducial thereon is at a first specified position with respect to the imaging reference frame and recording a position of the object with respect to the motion reference frame, that recorded position being referred to as a first object position;

B. positioning the object so that a fiducial thereon is at a second specified position with respect to the imaging reference frame and recording a position of the object with respect to the motion reference frame, that recorded position being referred to as a second object position;

C. positioning the object so that a fiducial thereon is at a third specified position with respect to the imaging reference frame and recording a position of the object with respect to the motion reference frame, that recorded position being referred to as a third object position; and D. determining a calibration relationship between the reference frame of motion of the object and the reference frame of the camera as a function of respective motion reference frame coordinates of the first, second, and third object positions.

2. A method according to claim 1, wherein the second and third specified positions are substantially equidistant from the first specified position with respect to the imaging reference frame.

3. A method according to claim 2, wherein the second and third specified positions are substantially a unit distance from the first specified position with respect to the imaging reference frame.

4. A method according to claim 1, wherein line segments connecting the first specified position and each of the two specified positions are perpendicular to one another.

5. A method according to claim 1, wherein
   i. the first, second and third specified positions lie substantially on axes of the imaging reference frame;
   ii. the first specified position substantially lying on a center of the imaging reference frame; and
   iii. the second and third specified positions substantially lying on respective axes of the imaging reference frame.

6. A method according to claim 5, wherein the second and third specified positions each lie substantially k units from the first specified position with respect to the imaging reference frame.

7. A method according to claim 6, step (D) includes the step of determining τ, an orientation of the imaging reference frame with respect to the motion reference frame, based substantially on a mathematical relation:

$$\tau = \text{atan2}\ (m_{y1}-m_{y0}, m_{x1}-m_{x0})$$

where ($m_{x0}, m_{y0}$) are the motion reference frame coordinates of the first object position;

($m_{x1}, m_{y1}$) are the motion reference frame coordinates of the second object position;

atan2 ( ) is an arctangent function.

8. A method according to claim 6, step (D) includes the step of determining at least one of a pixel width, w, and a pixel height, h, of the image frame with respect to the motion reference frame in accord with a mathematical relation:

$$w = \text{sqrt}\ ((m_{y1}-m_{y0})^2 + (m_{x1}-m_{x0})^2)/\text{abs}\ (i_{x1}-i_{x0})$$

$$h = \text{sqrt}\ ((m_{y2}-m_{y0})^2 + (m_{x2}-m_{x0})^2)/\text{abs}\ (i_{y2}-i_{y0})$$

where, w is the unit height of the imaging reference frame vis-à-vis the motion reference frame;

h is the unit height of the imaging reference frame vis-à-vis the motion reference frame;

($m_{x0}, m_{y0}$) are the motion reference frame coordinates of the first object position;

($m_{x1}, m_{y1}$) are the motion reference frame coordinates of the second object position;

($m_{x2}, m_{y2}$) are the motion reference frame coordinates of the third object position;

($i_{x0}, i_{y0}$) are the image coordinates of the first object position;

($i_{x1}, i_{y1}$) are the image coordinates of the second object position;

($i_{x2}, i_{y2}$) are the image coordinates of the second object position;

sqrt ( ) is a square root function; and abs ( ) is an absolute value function.

9. A machine vision method of determining a calibration relationship between a motion reference frame of a moveable object and an imaging reference frame of an imaging device that acquires an image of the object, the method comprising the steps of:

A. positioning the object so that a fiducial thereon moves to each of three specified positions with respect to the imaging reference frame and recording, for each of those specified positions, a corresponding position of the object with respect to the motion reference frame; wherein the specified positions lie substantially on axes of the imaging reference frame; and wherein a first specified position substantially lies on a center of the imaging reference frame; and wherein second and third specified positions substantially lie on respective axes of the imaging reference frame;

B. determining a calibration relationship between the reference frame of motion of the object and the reference frame of the camera in accord with any of the following mathematical relations:

$$\tau = \text{atan2}\,(m_{y1}-m_{y0}, m_{x1}-m_{x0})$$

$$w = \text{sqrt}\,((m_{y1}-m_{y0})^2 + (m_{x1}-m_{x0})^2)/\text{abs}\,(i_{x1}-i_{x0})$$

$$h = \text{sqrt}\,((m_{y2}-m_{y0})^2 + (m_{x2}-m_{x0})^2)/\text{abs}\,(i_{y2}-i_{y0})$$

where $\tau$ is an angular orientation of the imaging reference frame with respect to the motion reference frame;

h is a pixel height in the imaging reference frame with respect to the motion reference frame;

w is a pixel width in the imaging reference frame with respect to the motion reference frame;

$(m_{x0}, m_{y0})$ are the motion reference frame coordinates of the first object position;

$(m_{x1}, m_{y1})$ are the motion reference frame coordinates of the second object position;

$(m_{x2}, m_{y2})$ are the motion reference frame coordinates of the third object position;

atan2 ( ) is an arctangent function;

$(i_{x0}, i_{y0})$ are the image coordinates of the first object position;

$(i_{x1}, i_{y1})$ are the image coordinates of the second object position;

$(i_{x2}, i_{y2})$ are the image coordinates of the second object position;

sqrt ( ) is a square root function; and abs ( ) is an absolute value function.

10. A machine vision apparatus for determining a calibration relationship between a motion reference frame of moveable object and an imaging reference frame of an imaging device that acquires an image of the object, the apparatus comprising:

A. first positioning means, coupled to the object and to the imaging device, for positioning the object so that a fiducial thereon is at a first specified position with respect to the imaging reference frame and recording a position of the object with respect to the motion reference frame, that recorded position being referred to as a first object position;

B. second positioning means, coupled to the object and to the imaging device, for positioning the object so that a fiducial thereon is at a second specified position with respect to the imaging reference frame and recording a position of the object with respect to the motion reference frame, that recorded position being referred to as a second object position;

C. third positioning means, coupled to the object and to the imaging device, positioning the object so that a fiducial thereon is at a third specified position with respect to the imaging reference frame and recording a position of the object with respect to the motion reference frame, that recorded position being referred to as a third object position; and D. analysis means, coupled to the first, second and third positioning means, for determining a calibration relationship between the reference frame of motion of the object and the reference frame of the camera as a function of respective motion reference frame coordinates of the first, second, and third object positions.

11. An apparatus according to claim 10, wherein the second and third specified positions are substantially equidistant from the first specified position with respect to the imaging reference frame.

12. An apparatus according to claim 11, wherein the second and third specified positions are substantially a unit distance from the first specified position with respect to the imaging reference frame.

13. An apparatus according to claim 10, wherein line segments connecting the first specified position and each of the two specified positions are perpendicular to one another.

14. An apparatus according to claim 10, wherein i. the first, second and third specified positions lie substantially on axes of the imaging reference frame;

ii. the first specified position substantially lying on a center of the imaging reference frame; and iii. the second and third specified positions substantially lying on respective axes of the imaging reference frame.

15. An apparatus according to claim 14, wherein the second and third specified positions each lie substantially k units from the first specified position with respect to the imaging reference frame.

16. An apparatus according to claim 15, wherein the analysis means determines $\tau$, an orientation of the imaging reference frame with respect to the motion reference frame, based substantially on a mathematical relation:

$$\tau = \text{atan2}\,(m_{y1}-m_{y0}, m_{x1}-m_{x0})$$

where $(m_{x0}, m_{y0})$ are the motion reference frame coordinates of the first object position;

$(m_{x1}, m_{y1})$ are the motion reference frame coordinates of the second object position;

atan2 ( ) is an arctangent function.

17. An apparatus according to claim 15, wherein the analysis means determines at least one of a pixel width, w, and a pixel height, h, of the image frame with respect to the motion reference frame in accord with a mathematical relation:

$$w = \text{sqrt}\,((m_{y1}-m_{y0})^2 + (m_{x1}-m_{x0})^2)/\text{abs}\,(i_{x1}-i_{x0})$$

$$h = \text{sqrt}\,((m_{y2}-m_{y0})^2 + (m_{x2}-m_{x0})^2)/\text{abs}\,(i_{y2}-i_{y0})$$

where, w is the unit height of the imaging reference frame vis-à-vis the motion reference frame;

h is the unit height of the imaging reference frame vis-à-vis the motion reference frame;

$(m_{x0}, m_{y0})$ are the motion reference frame coordinates of the first object position;

$(m_{x1}, m_{y1})$ are the motion reference frame coordinates of the second object position;

$(m_{x2}, m_{y2})$ are the motion reference frame coordinates of the third object position;

$(i_{x0}, i_{y0})$ are the image coordinates of the first object position;

$(i_{x1}, i_{y1})$ are the image coordinates of the second object position;

$(i_{x2}, i_{y2})$ are the image coordinates of the second object position;

sqrt ( ) is a square root function; and abs ( ) is an absolute value function.

18. A machine vision apparatus for determining a calibration relationship between a motion reference frame of a moveable object and an imaging reference frame of an image acquisition device that acquires an image of the object, the apparatus comprising:

A. positioning means, coupled to the object and to the image acquisition device, for positioning the object so that a fiducial thereon moves to each of three specified positions with respect to the imaging reference frame and recording, for each of those specified positions, a corresponding position of the object with respect to the motion reference frame; wherein the specified positions lie substantially on axes of the imaging reference frame; and wherein a first specified position substantially lies on a center of the imaging reference frame; and wherein second and third specified positions substantially lie on respective axes of the imaging reference frame;

B. analysis means for determining a calibration relationship between the reference frame of motion of the object and the reference frame of the camera in accord with any of the following mathematical relations:

$$\tau = \text{atan2}\ (m_{y1}-m_{y0}, m_{x1}-m_{x0})$$

$$w = \text{sqrt}\ ((m_{y1}-m_{y0})^2+(m_{x1}-m_{x0})^2)/\text{abs}\ (i_{x1}-i_{x0})$$

$$h = \text{sqrt}\ ((m_{y2}-m_{y0})^2+(m_{x2}-m_{x0})^2)/\text{abs}\ (i_{y2}-i_{y0})$$

where $\tau$ is an angular orientation of the imaging reference frame with respect to the motion reference frame;

h is a pixel height in the imaging reference frame with respect to the motion reference frame;

w is a pixel width in the imaging reference frame with respect to the motion reference frame;

$(m_{x0}, m_{y0})$ are the motion reference frame coordinates of the first object position;

$(m_{x1}, m_{y1})$ are the motion reference frame coordinates of the second object position;

$(m_{x2}, m_{y2})$ are the motion reference frame coordinates of the third object position;

atan2 ( ) is an arctangent function;

$(i_{x0}, i_{y0})$ are the image coordinates of the first object position;

$(i_{x1}, i_{y1})$ are the image coordinates of the second object position;

$(i_{x2}, i_{y2})$ are the image coordinates of the second object position;

sqrt ( ) is a square root function; and abs ( ) is an absolute value function.

19. An article of manufacture comprising a computer usable medium embodying program code for causing a digital data processor to carry out a method of determining a calibration relationship between a motion reference frame of a moveable object and an imaging reference frame of an imaging device that acquires an image of the object, the method comprising the steps of:

A. positioning the object so that a fiducial thereon is at a first specified position with respect to the imaging reference frame and recording a position of the object with respect to the motion reference frame, that recorded position being referred to as a first object position;

B. positioning the object so that a fiducial thereon is at a second specified position with respect to the imaging reference frame and recording a position of the object with respect to the motion reference frame, that recorded position being referred to as a second object position;

C. positioning the object so that a fiducial thereon is at a third specified position with respect to the imaging reference frame and recording a position of the object with respect to the motion reference frame, that recorded position being referred to as a third object position; and D. determining a calibration relationship between the reference frame of motion of the object and the reference frame of the camera as a function of respective motion reference frame coordinates of the first, second, and third object positions.

20. An article of manufacture according to claim 19, wherein the second and third specified positions are substantially equidistant from the first specified position with respect to the imaging reference frame.

21. An article of manufacture according to claim 20, wherein the second and third specified positions are substantially a unit distance from the first specified position with respect to the imaging reference frame.

22. An article of manufacture according to claim 19, wherein line segments connecting the first specified position and each of the two specified positions are perpendicular to one another.

23. An article of manufacture according to claim 19, wherein i. the first, second and third specified positions lie substantially on axes of the imaging reference frame;

ii. the first specified position substantially lying on a center of the imaging reference frame; and iii. the second and third specified positions substantially lying on respective axes of the imaging reference frame.

24. An article of manufacture according to claim 23, wherein the second and third specified positions each lie substantially k units from the first specified position with respect to the imaging reference frame.

25. An article of manufacture according to claim 24, step (D) includes the step of determining $\tau$, an orientation of the imaging reference frame with respect to the motion reference frame, based substantially on a mathematical relation:

$$\tau = \text{atan2}\ (m_{y1}-m_{y0}, m_{x1}-m_{x0})$$

where $(m_{x0}, m_{y0})$ are the motion reference frame coordinates of the first object position;

$(m_{x1}, m_{y1})$ are the motion reference frame coordinates of the second object position;

atan2 ( ) is an arctangent function.

26. An article of manufacture according to claim 24, step (D) includes the step of determining at least one of a pixel width, w, and a pixel height, h, of the image frame with respect to the motion reference frame in accord with a mathematical relation:

$$w = \text{sqrt}\ ((m_{y1}-m_{y0})^2+(m_{x1}-m_{x0})^2)/\text{abs}\ (i_{x1}-i_{x0})$$

$$h = \text{sqrt}\ ((m_{y2}-m_{y0})^2+(m_{x2}-m_{x0})^2)/\text{abs}\ (i_{y2}-i_{y0})$$

where, w is the unit height of the imaging reference frame vis-à-vis the motion reference frame;

h is the unit height of the imaging reference frame vis-à-vis the motion reference frame;

$(m_{x0}, m_{y0})$ are the motion reference frame coordinates of the first object position;

$(m_{x1}, m_{y1})$ are the motion reference frame coordinates of the second object position;

$(m_{x2}, m_{y2})$ are the motion reference frame coordinates of the third object position;

$(i_{x0}, i_{y0})$ are the image coordinates of the first object position;

($i_{x1}$, $i_{y1}$) are the image coordinates of the second object position;

($i_{x2}$, $i_{y2}$) are the image coordinates of the second object position;

sqrt ( ) is a square root function; and abs ( ) is an absolute value function.

27. An article of manufacture of determining a calibration relationship between a motion reference frame of a moveable object and an imaging reference frame of an imaging device that acquires an image of the object, the method comprising the steps of:

A. positioning the object so that a fiducial thereon moves to each of three specified positions with respect to the imaging reference frame and recording, for each of those specified positions, a corresponding position of the object with respect to the motion reference frame; wherein the specified positions lie substantially on axes of the imaging reference frame; and wherein a first specified position substantially lies on a center of the imaging reference frame; and wherein second and third specified positions substantially lie on respective axes of the imaging reference frame;

B. determining a calibration relationship between the reference frame of motion of the object and the reference frame of the camera in accord with any of the following mathematical relations:

$$\tau = \text{atan2} \ (m_{y1}-m_{y0}, m_{x1}-m_{x0})$$

$$w = \text{sqrt} \ ((m_{y1}-m_{y0})^2 + (m_{x1}-m_{x0})^2)/\text{abs} \ (i_{x1}-i_{x0})$$

$$h = \text{sqrt} \ ((m_{y2}-m_{y0})^2 + (m_{x2}-m_{x0})^2)/\text{abs} \ (i_{y2}-i_{y0})$$

where $\tau$ is an angular orientation of the imaging reference frame with respect to the motion reference frame;

h is a pixel height in the imaging reference frame with respect to the motion reference frame;

w is a pixel width in the imaging reference frame with respect to the motion reference frame;

($m_{x0}$, $m_{y0}$) are the motion reference frame coordinates of the first object position;

($m_{x1}$, $m_{y1}$) are the motion reference frame coordinates of the second object position;

($m_{x2}$, $m_{y2}$) are the motion reference frame coordinates of the third object position;

atan2 ( ) is an arctangent function;

($i_{x0}$, $i_{y0}$) are the image coordinates of the first object position;

($i_{x1}$, $i_{y1}$) are the image coordinates of the second object position;

($i_{x2}$, $i_{y2}$) are the image coordinates of the second object position;

sqrt ( ) is a square root function; and abs ( ) is an absolute value function.

* * * * *